United States Patent [19]

Fleissner

[11] Patent Number: 4,771,497
[45] Date of Patent: Sep. 20, 1988

[54] PROCESS AND APPARATUS FOR THE CONTINUOUS TREATMENT OF LENGTHS OF TEXTILE MATERIAL, SUCH AS CARPETS

[75] Inventor: Gerold Fleissner, Chur, Switzerland

[73] Assignee: Vepa Aktiengesellschaft, Basel, Switzerland

[21] Appl. No.: 68,763

[22] Filed: Jun. 29, 1987

Related U.S. Application Data

[63] Continuation of Ser. No. 715,267, Mar. 25, 1985, abandoned.

[30] Foreign Application Priority Data

Mar. 23, 1984 [DE] Fed. Rep. of Germany ....... 3410740
May 30, 1984 [DE] Fed. Rep. of Germany ....... 3420208

[51] Int. Cl.⁴ ............................................. D06B 21/00
[52] U.S. Cl. ........................................ 8/149.1; 8/151;
  8/929; 68/5 D; 68/9; 68/13 R
[58] Field of Search ................... 8/149.1, 151, 929;
  68/5 D, 5 E, 9, 13 R

[56] References Cited

U.S. PATENT DOCUMENTS

| | | | |
|---|---|---|---|
| 3,605,666 | 9/1971 | Kimmel et al. | 8/929 X |
| 4,013,407 | 3/1977 | Ray, Jr. | 8/929 X |
| 4,365,968 | 12/1982 | Gregorian et al. | 8/149.1 X |
| 4,391,604 | 7/1983 | Schomakers | 8/929 X |
| 4,524,589 | 6/1985 | Fleissner | 68/13 R X |
| 4,578,132 | 3/1986 | Van Uden et al. | 8/929 X |

FOREIGN PATENT DOCUMENTS 1157737  7/1969 United Kingdom .................. 8/929

Primary Examiner—Philip R. Coe
Attorney, Agent, or Firm—Antonelli, Terry & Wands

[57] ABSTRACT

A continuous process and an apparatus for effecting, in direct succession a dyeing and backing of a carpet, for example, in the process, the dyeing step is performed with a minimum application of dyeing liquor, making it possible to effect backing wet-on-wet without a washing step and an expensive drying procedure. The dyeing step can also be directly preceded by the carpet manufacturing process within the framework of a continuous installation.

16 Claims, 1 Drawing Sheet

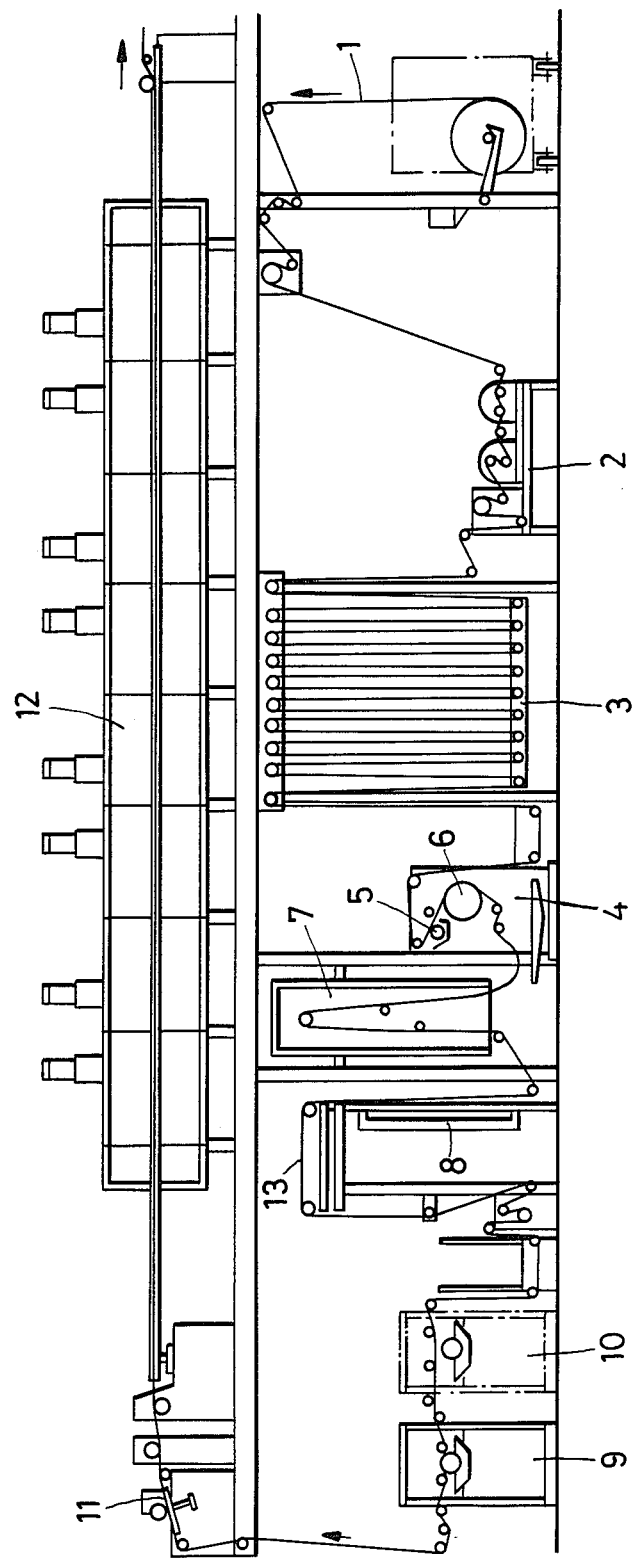

PROCESS AND APPARATUS FOR THE CONTINUOUS TREATMENT OF LENGTHS OF TEXTILE MATERIAL, SUCH AS CARPETS

This application is a continuation of application Ser. No. 715,267, filed Mar. 25, 1985, and now abandoned.

This invention relates to a process for the continuous treatment of lengths of textile material, especially carpets of a relatively great width with a pile-type face, wherein the length of material is provided, for dyeing purposes, with a minimum amount of aqueous liquor containing the dyeing chemicals, a precoat of backing material is applied and then the precoated length of material is transported through a steamer for effecting dye fixation.

A dyeing device for treatment of textiles has been known from DOS No. 3,045,644. This device is especially advantageous for the uniform dyeing of pile-type carpets having a relatively large operating width, such as 5 meters, for example, since with the aid of this device a uniform application of the dye liquor is possible by pouring or padding, and the dye liquor distribution then becomes uniform deep down to the root of the pile fiber by massaging the pile surface. The advantage of this dyeing process resides not only in the uniformity and the small amount of dye liquor required, but also in a brief steaming period and in the avoidance of an expensive washing and drying procedure (note, in this connection, DOS No. 1,635,096).

It is known to roll up a carpet and to subject it to intermediate storage after dyeing, steaming, washing, and drying thereof. Depending on the capacity of a coating installation, the dyed carpet is then provided with a precoat material on its underside and, optionally in a continuous procedure, after adequate binding of the pile to the basic material of the fabric, a foam is furthermore applied by a coating knife or by laminating, or cemented to a second backing layer which then must be dried and vulcanized. Respectively, one continuous installation and, for such installation, a specific number of operating personnel are required in each case for the dyeing of the carpet as well as for the backing of the carpet, apart from the required intermediate storage facility and the conveying paths between the dyeing plant and the backing installation.

The invention is based on the object of simplifying this complicated treatment method in order to tie up less capital and in order to be able to deliver directly a dyed and backed carpet using only the same number of operating personnel of one conventional continuous installation.

Starting with the process of the type heretofore described, the invention, for solving the thus-posed problem, provides a process wherein immediately following the dyeing operation, the optionally predried carpet material is provided with a precoat of backing material on the backside (i.e., the side free of pile fibers), of the material in a wet-on-wet procedure and is at least pre-dried. Immediately thereafter, it is then also possible to apply to the precoated backside additionally a foam by means of a coating knife; the foam can be laminated and/or a second backing material can be glued thereon, and thereafter the textile material is passed into another horizontal heat treatment device for drying and vulcanizing. Thus, a continuous dyeing of the pile and coating of the backside of the carpet take place in direct succession; namely, without having to wash and dry the carpet after dyeing. This is possible according to the invention with a minimum application of dye liquor (40-200%) and a subsequent massaging of the pile to distribute the dye liquor along the vertical extension of the pile so that this novel process makes it possible not only to entirely eliminate several units taking up a rather great amount of space, such as, in particular, washing and drying machines, within the continuous installation, but also to operate the installation required for performing the process by means of only one operating team of, for example, a customary coating installation, optionally with one additional drier.

The process of this invention has the advantage that it is not required to add to the dye liquor any wetting agents, any thickener, or any other auxiliary agents which must be washed out after dyeing; that is, in the present case, auxiliary agents can already be introduced into the dyeing liquor which customarily would be added only after the washing step, now eliminated; namely, agents that have a positive effect on the final quality, such as dirt-repelling auxiliary agents or auxiliary agents which advantageously alter the mechanical usage properties.

Advantageously, this one-color application can subsequently be provided with a pattern in a wet-on-wet procedure, for example, by discharge printing or foam printing, but this foam must not contain any thickeners. Depending on the shape of the stencil, a coloring effect of tone-in-tone with brightness differences can also be achieved.

It is even possible in the process of this invention not only to combine the dyeing and backing procedures, but also to join same directly with the carpet manufacturing process by continuously providing a carrier panel with the carpet pile, such as by gluing, for example, and immediately thereafter beginning the dyeing step—or also with circumvention of the dyeing station—the backing and/or laminating operation.

An apparatus for conducting the process comprises a series of units for effecting the necessary steps; in particular, the apparatus includes a dye liquor application unit for applying the dye liquor to the pile face, a steamer for effecting predrying, an application unit for applying the precoat to the backside and a steamer for effecting dye fixation.

The figure shows a continuous plant arranged in two tiers and made up of processing units operating in sequence.

The carpet 1, in this embodiment already provided with the pile and rolled up after manufacture, which carpet can also be cut into tiles subsequently to the treatment to be described, is pulled off a reel, aligned in a unit 2 with respect to fabric bowing and position, then passed through a buffer device 3 and fed to the dye applicating unit 4 for application of the dye chemicals or for imprinting of the pile with the dye chemical. The dye liquor can be applied by a kiss, roller, padder, or sprayer. The illustrated unit consists of a kiss roller 5 optionally engraved or provided with an oscillating coater knife, this roller applying to the pile a minimum amount of dye liquor, and of a rod-shaped rotor 6 which, immediately following the application step, massages the pile to distribute the liquor uniformly over the pile of the carpet panel. The liquor also contains auxiliary agents which can be applied, for example, fixation accelerators and agents favorably affecting the final quality, since these agents, prone to being washed out, are here not subjected to a washing-out step. The unit 4 can be followed by a printing unit for discharge printing or foam printing by means of a stencil or a printing roller (now shown).

The carpet 1 subsequently passes into a festoon steamer 7, illustrated only with one loop in this embodiment. It is also possible to enlarge the steamer to obtain a longer residence time. However, this is necessary only in some cases since fixation accelerators are admixed to the dye liquor, and subsequent fixation takes place in the dryer 8, 13 arranged downstream thereof, and also furthermore in the tentering frame 12. After steaming, the carpet back, in the present embodiment, is transported along a vertically arranged heating section 8 equipped with infrared radiators, predried therein, and then guided horizontally for a certain distance 13 during which the drying steam, rising through the pile, now effects subsequent fixation of the dyed fibers of the pile. This drying step, acting on the side to be coated, can also be omitted, depending on the dyeing procedure. The important aspect resides in that the dye liquor has not wetted the underside or backside of the carpet, and the precoat material is so viscous that no predrying for the coating is required.

Immediately following the predrying step with the aid of the heating section 8, the back is now provided, wet on wet, with a precoat material; for this purpose, the kiss roller units 9 and 10 are arranged in the installation. Depending on the procedure, two units, or also only one unit, are or is required. The precoat material can also be applied by means of a coating knife unit 11. After the back of the carpet has thus been processed, after binding the pile in the substrate layer by means of the precoat, the turned carpet, facing upwards with its back, is transported back in a second tier. After applying another precoat by coater knife in the unit 11 to the back of the carpet, the coat is predried in the subsequent tentering frame 12, extending horizontally. This tentering frame 12 is followed by another tentering frame, not shown, with additional treatment devices responsible for application of additional foam layers and for the drying and vulcanizing of the backing. In these horizontal treatment asemblies, with separation of top ventilation and bottom ventilation, the pile can also be additionally treated by steam sprayed therein, and the dye can thus be fixed in a final step.

It will be appreciated from the foregoing description of the invention that steaming only is carried out in steamer 7. There is no drying at this stage, usually the steamer is even longer. Steaming depends on the speed of the textile goods, and this, in turn, depends on the coating speed. Dyeing is carried out with a liquid dye, and steaming introduces moisture into the textile goods (condensate of saturated steam), but precoating can only be carried out (i.e., bonding of the pile fibers into the back of the carpet) when the carpet is not wet on the coating side, because, otherwise, the precoat will not hold. The process according to the invention, therefore, uses little liquor for dyeing and no wash after dye fixing (possibly the carpet can be washed a little, for example, by spraying wash fluid on it (hot) and then drawing it off at once). Consequently, the back of the carpet is at least largely dry.

The expression "wet on wet" means that no complete drying process is provided in the process before the precoating.

After dye fixing, the dyed fiber must be bonded to the back of the carpet. This is done initially with the precoat, which is applied in an unfoamed condition; i.e., as a viscous liquid. Then the precoat must be predried, so that when the foam coat is applied, the pile fibers will not shift on the back of the carpet. The coating material forming the precoat is latex; i.e., a synthetic or natural binder. The binder not only must be dry at the end of the processing, but must also be vulcanized.

What is claimed is:

1. A process for the continuous treatment of a length of textile material, especially a carpet having a relatively large width with a pile-type face side, which comprises applying a minimum amount of treatment liquor containing dyeing chemicals directly to the pile-type face side, then steaming the dye-containing textile material to initiate dye fixation, immediately thereafter applying a liquid precoat backing material to the backside of the textile material and predrying the textile material; prior to applying the liquid precoat of backing material and after steaming, predrying the steamed textile material by subjecting the textile material to a suction step.

2. A process according to claim 1, wherein the application of the treatment liquor takes place by printing.

3. A process for the continuous treatment of a length of textile material, especially, a carpet of a relatively large width with a pile-type face side, which comprises providing the textile material for dyeing, with a minimum amount of aqueous liquor containing dyeing chemicals, repeatedly massaging the wetted surface of the textile material while the material travels along a rotor partially looped around by the textile material, and transporting the material through a steamer for steaming the textile material to effect dye fixation; said process being further characterized in that immediately following dyeing treatment step and without a washing step, the material is provided, on the back of the material, with a precoat and is at least predried.

4. A process according to claim 3, wherein the dye liquor contains only the chemicals required for the actual dyeing step and is free of thickeners or foam chemicals, and the back-coating step is executed, after the steaming for dye fixation, in a continuous treatment process.

5. A process according to claim 4, wherein auxiliary agents that can be washed out, including dirt-repellents and/or auxiliary agents positively affecting the mechanical usage properties, are admixed with the dye liquor.

6. A process according to claim 3, wherein the length of material, dyed with a minimum application, is provided with a second dye application that alters the color.

7. A process according to claim 6, wherein as the second dye application, a discharge agent is applied with the aid of a stencil.

8. A process according to claim 6, wherein as the second dye application, a dye is applied, in the form of a foam without thickener content, by means of a printing stencil or printing roller.

9. A process according to claim 3, wherein the textile material is, after steaming, predried only on the back of the material by means of high-energy radiation, and is then provided a binder precoat.

10. A process according to claim 3, wherein the textile material is subjected to a suction step for predrying purposes.

11. A process according to claim 3, wherein the pile and/or the dye, additionally to being steamed in the steamer, is furthermore steamed, for dye fixation, during predrying and also during the drying of the precoat by spraying steam onto the pile face of the length of material.

12. A process according to claim 3, wherein the back of the textile material with the predried precoat is furthermore provided with a rubber foam, with a second backing, alternatively by laminating, and the textile material is subsequently transported into a horizontal heat treatment device for drying and vulcanizing.

13. A process according to claim 3, wherein there is not only provided a direct succession of the treatment of dyeing of the pile face and coating of the back of the material, but also the carpet manufacture, including pile production, immediately precedes the dyeing treatment.

14. A process according to claim 3, where there is not only provided a direct succession of the treatment of dyeing of the pile face and the coating of the back of the material, but also the carpet manufacture, including pile production, directly precedes the coating treatment.

15. A process according to claim 3, wherein after steaming to effect dye fixation, the dye-containing textile material is predried and then again steamed to effect further dye fixation.

16. A process for the continuous treatment of a length of textile material, esxpecially a carpet having a relatively large width with a pile-type face side which comprises applying a minimum amount of treatment liquor containing dyeing chemicals directly to the pile-type face side, then steaming the dye-containing textile material to initiate dye fixation, immediately thereafter applying a liquid precoat of backing material to the backside of the textile material and predrying the textile material; prior to applying the liquid precoat of backing material and after steaming to effect dye fixation, the textile material is predried and again steamed to effect further dye fixation.

* * * * *